United States Patent
Siripunkaw et al.

(10) Patent No.: US 9,954,731 B2
(45) Date of Patent: *Apr. 24, 2018

(54) DEVICE-TO-DEVICE COMMUNICATION AMONG CUSTOMER PREMISE EQUIPMENT DEVICES

(71) Applicant: Comcast Cable Communications, LLC, Philadelphia, PA (US)

(72) Inventors: Pak Siripunkaw, Sickerville, NJ (US); Emery J. Weber, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,619

(22) Filed: Jul. 1, 2013

(65) Prior Publication Data

US 2014/0047087 A1 Feb. 13, 2014

Related U.S. Application Data

(63) Continuation of application No. 12/906,195, filed on Oct. 18, 2010, now Pat. No. 8,493,987, which is a (Continued)

(51) Int. Cl.
*H04L 12/24* (2006.01)
*H04L 12/28* (2006.01)
(Continued)

(52) U.S. Cl.
CPC ...... *H04L 41/0806* (2013.01); *H04L 12/2801* (2013.01); *H04L 41/046* (2013.01);
(Continued)

(58) Field of Classification Search
CPC ............. H04L 12/2801; H04L 41/0806; H04L 41/082; H04M 7/1245
(Continued)

(56) References Cited

U.S. PATENT DOCUMENTS

| 6,351,773 B1 | 2/2002 | Fijolek et al. |
| 6,768,743 B1 | 7/2004 | Borella et al. |

(Continued)

FOREIGN PATENT DOCUMENTS

WO 2005079000 A1 8/2005

OTHER PUBLICATIONS

ISR issued in PCT/US08/081422, dated Dec. 23, 2008.
(Continued)

*Primary Examiner* — Kevin C Harper
*Assistant Examiner* — Derrick V Rose
(74) *Attorney, Agent, or Firm* — Banner & Witcoff, Ltd.

(57) ABSTRACT

A method of initializing, provisioning, and managing a cable modem and a customer premise equipment device includes sending a customized configuration file to the cable modem. The configuration file contains service provisioning information and further includes information indicative of a device-to-device communication configuration. A message is passed from the cable modem to the customer premise equipment device indicative of the device-to-device communication configuration. The customer premise equipment device is initialized for device-to-device communication with any other customer premise equipment devices in accordance with the device-to-device communication configuration indicated in the message, which relates to physical layer and data link layer communications among customer premise equipment devices. In this way, the customer premise equipment device knows how to communicate with other customer premise equipment devices, for example, at the same subscriber location.

20 Claims, 3 Drawing Sheets

Related U.S. Application Data continuation of application No. 11/603,422, filed on Nov. 22, 2006, now Pat. No. 7,839,870.

(60) Provisional application No. 60/791,803, filed on Apr. 13, 2006, provisional application No. 60/739,472, filed on Nov. 23, 2005.

(51) Int. Cl.
| | |
|---|---|
| *H04N 7/173* | (2011.01) |
| *H04N 21/426* | (2011.01) |
| *H04N 21/443* | (2011.01) |
| *H04N 21/61* | (2011.01) |
| *H04L 29/12* | (2006.01) |

(52) U.S. Cl.
CPC ........ *H04L 41/082* (2013.01); *H04L 41/0843* (2013.01); *H04L 61/2015* (2013.01); *H04N 7/17309* (2013.01); *H04N 21/42676* (2013.01); *H04N 21/42684* (2013.01); *H04N 21/4432* (2013.01); *H04N 21/6118* (2013.01); *H04L 29/12009* (2013.01); *H04L 61/00* (2013.01)

(58) Field of Classification Search
USPC .......................... 370/235–401; 709/217–223
See application file for complete search history.

(56) References Cited

U.S. PATENT DOCUMENTS

| | | | |
|---|---|---|---|
| 7,158,543 B1* | 1/2007 | Garakani et al. ............. 370/526 |
| 7,353,021 B2 | 4/2008 | Ejzak et al. | |
| 7,373,660 B1* | 5/2008 | Guichard et al. ............... 726/15 |
| 7,467,214 B2 | 12/2008 | Chin | |
| 7,839,870 B2* | 11/2010 | Siripunkaw et al. ......... 370/401 |
| 8,493,987 B2* | 7/2013 | Siripunkaw et al. ......... 370/401 |
| 2001/0053159 A1 | 12/2001 | Bunn et al. | |
| 2002/0066033 A1 | 5/2002 | Dobbins et al. | |
| 2003/0106067 A1* | 6/2003 | Hoskins et al. .............. 725/119 |
| 2004/0048609 A1* | 3/2004 | Kosaka ............... H04W 56/002 455/422.1 |
| 2004/0095923 A1 | 5/2004 | Ejzak et al. | |
| 2004/0103308 A1* | 5/2004 | Paller .................... H04W 12/08 726/12 |
| 2004/0153665 A1 | 8/2004 | Browne | |
| 2005/0005154 A1 | 1/2005 | Danforth et al. | |
| 2005/0055708 A1 | 3/2005 | Gould et al. | |
| 2005/0232304 A1* | 10/2005 | Quigley ................ H04J 3/1694 370/486 |
| 2005/0233742 A1 | 10/2005 | Karaoguz et al. | |
| 2006/0059092 A1 | 3/2006 | Burshan et al. | |
| 2006/0104232 A1* | 5/2006 | Gidwani ............... H04W 28/18 370/328 |
| 2006/0123118 A1 | 6/2006 | Choe et al. | |
| 2006/0191005 A1* | 8/2006 | Muhamed et al. ............. 726/15 |
| 2006/0223497 A1 | 10/2006 | Gallagher et al. | |
| 2007/0011725 A1 | 1/2007 | Sahay et al. | |
| 2007/0214265 A1 | 9/2007 | Zampiello et al. | |
| 2008/0034071 A1 | 2/2008 | Wilkinson et al. | |
| 2008/0060064 A1 | 3/2008 | Wynn et al. | |
| 2008/0189778 A1 | 8/2008 | Rowley | |
| 2008/0209537 A1 | 8/2008 | Wong et al. | |
| 2010/0083362 A1* | 4/2010 | Francisco ......................... 726/9 |
| 2013/0091534 A1 | 4/2013 | Gilde et al. | |

OTHER PUBLICATIONS

EP Search Report 08 84 6111, dated Feb. 7, 2011.
ISR issued in PCT/US06/45184, dated Oct. 29, 2007.
International Preliminary Report on Patentability issued in PCT/US06/45184, dated May 27, 2008.
European Office Action dated Aug. 1, 2013 in European Patent Application No. 08846111.6.
Canadian Office Action—Canadian Application 2568740—dated Jan. 26, 2015.
Canadian Office Action—CA 2,568,741—dated Feb. 18, 2015.
Canadian Office Action, dated Mar. 26, 2015—CA 2,700,625.
Canadian Office Action—CA Appl. 2,568,743—dated Apr. 2, 2015.
Response to Canadian Office Action—CA 2,568,740—dated Jul. 13, 2015.
Response to Canadian Office Action—CA Appl. 2,568,741—dated Aug. 18, 2015.
Canadian Office Action—CA App 2,700,625—dated Feb. 26, 2016.
Canadian Office Action—CA App 2,568,741—dated May 10, 2016.
Response to Canadian Office Action—CA 2,700,625—dated Sep. 14, 2015.
Response to Canadian Office Action—CA 2,568,743—dated Oct. 1, 2015.

\* cited by examiner

DEVICE-TO-DEVICE COMMUNICATION AMONG CUSTOMER PREMISE EQUIPMENT DEVICES

CROSS-REFERENCE TO RELATED APPLICATIONS

This application is a continuation of U.S. patent application Ser. No. 12/906,195, filed Oct. 18, 2010, which is a continuation of U.S. patent application Ser. No. 11/603,422, filed Nov. 22, 2006, which claims the benefit of U.S. provisional application Ser. No. 60/739,472, filed on Nov. 23, 2005, and U.S. provisional application Ser. No. 60/791,803, filed on Apr. 13, 2006. The contents of all the foregoing applications are hereby incorporated by reference.

BACKGROUND OF THE INVENTION

1. Field of the Invention

The invention relates to a method of initializing, provisioning, and managing a cable modem and a customer premise equipment device. The invention further relates to device-to-device communication among customer premise equipment devices.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application, the cable modem can obtain an IP address in a known manner, and customer premise equipment connected to the HFC network through the cable modem may obtain an IP address, for example, by utilizing DHCP.

A subscriber location may have multiple customer premise equipment devices. For example, the subscriber location may have multiple set-top boxes. It may be desirable to allow device-to-device communication among the set-top boxes within the subscriber location. However, configuring the set-top boxes for this communication may be difficult. For example, in a situation where there are a plurality of cable modem/set-top box pairs within a subscriber residence, traditional approaches may be used to connect each set-top box to the head end. However, in order to allow device-to-device communication among the set-top boxes in the residence, the devices must be configured. Although existing specifications provide for the configuration of communications with the head end, the devices are configured independently without any provision for device-to-device communication within the residence.

For the foregoing reasons, there is a need for a method of initializing, provisioning, and managing a cable modem and a customer premise equipment device in which the customer premise equipment device is informed as to the proper device-to-device communication configuration for communications among customer premise equipment devices, for example, at the same subscriber location.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In accordance with the invention, the method further comprises passing a message from the cable modem to the customer premise equipment device indicative of a device-to-device communication configuration. According to the invention, the configuration file, in addition to containing service provisioning information, further includes information indicative of a device-to-device communication configuration. This further information may be included in a number of custom fields in the configuration file. Adding these custom fields to the configuration file as contemplated by the invention allows the configuration file to indicate the device-to-device communication configuration for the customer premise equipment device. The customer premise equipment device receives the message passed from the cable modem, and is initialized for device-to-device communication with any other customer premise equipment devices in accordance with the device-to-device communication configuration indicated in the message. This specified device-to-device communication configuration relates to physical layer and data link layer communications among customer premise equipment devices.

At the more detailed level, the invention comprehends additional features. In one aspect, the customer premise equipment device is a set-top box. The device-to-device communication configuration relates to physical layer and data link layer communications among set-top boxes. For example, the cable modem connection to the CMTS is initialized in any suitable way; however, the configuration file sent to the cable modem further includes information indicative of the device-to-device communication configuration, and this information is passed in a message from the cable modem to the set-top box. The configuration relates to physical layer and data link layer communications, and may include information such as a specified radio frequency for the device-to-device communications. The set-top box and the cable modem may be both embedded in a subscriber gateway.

In preferred embodiments of the invention, the cable modem has a hardware address, for example, a media access control (MAC) address. The device-to-device communication configuration indicated by information in the configuration file sent from the network server is based at least in part on the hardware address of the cable modem. That is, configuration files may be customized on a per-modem basis. For example, set-top boxes located at the same subscriber location may be given a common physical layer and data link layer configuration for device-to-device communications.

DETAILED DESCRIPTION OF THE PREFERRED EMBODIMENT

Figure 1:
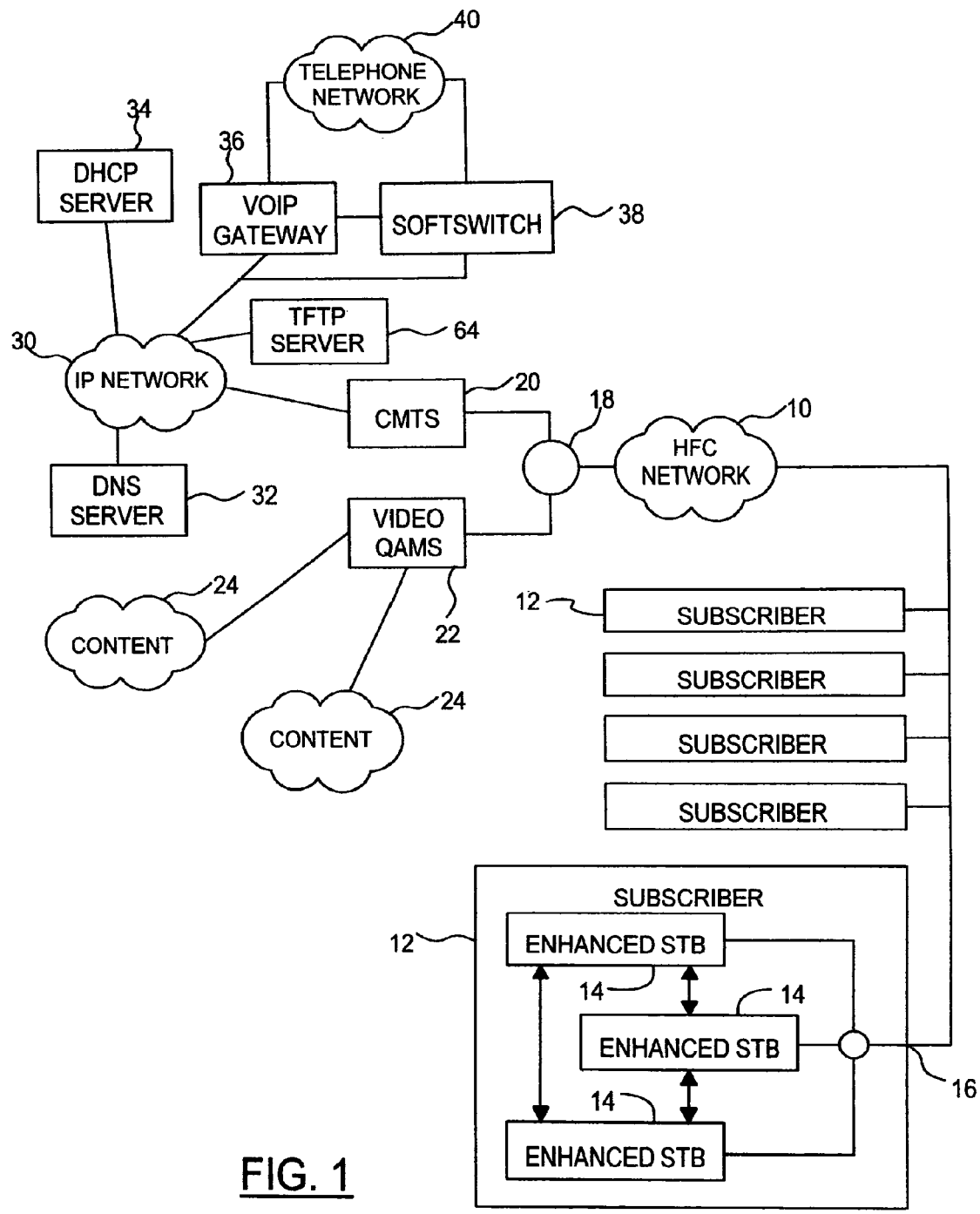
FIG. 1 illustrates a network diagram in accordance with a preferred embodiment of the invention.
Figure 2:
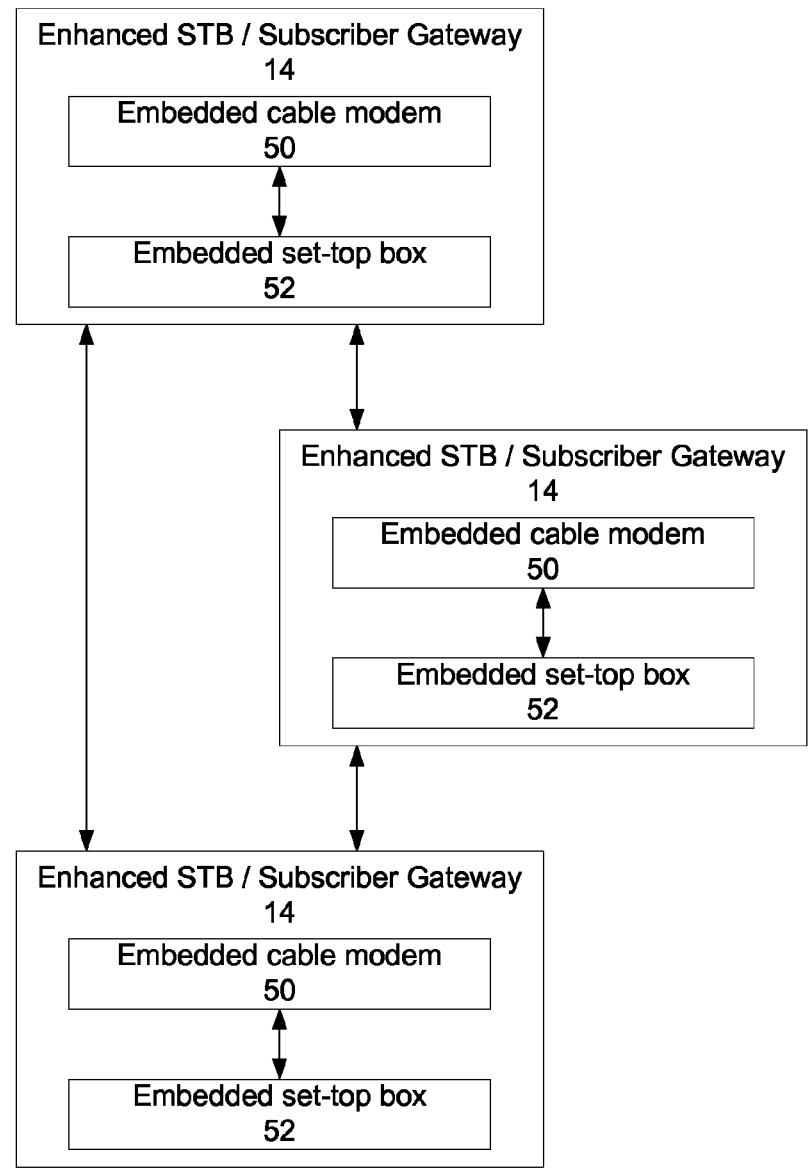
FIG. 2 illustrates multiple enhanced set-top boxes at a subscriber location, showing an embedded cable modem and embedded set-top box in each enhanced set-top box.

In FIG. 1, the hybrid fiber coax (HFC) network 10 provides service to a plurality of subscribers 12. Each subscriber 12 has one or more enhanced set-top boxes 14. An enhanced set-top box functions as a subscriber gateway, and includes an embedded cable modem 50 and an embedded set-top box 52 as shown in FIG. 2. The head end equipment includes cable modem termination system (CMTS) 20 and a plurality of video quadrature amplitude modulation (QAM) systems 22. Connector 18 illustrates the distribution of content from QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. In FIG. 1, CMTS 20 connects to the provider Internet protocol (IP) network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also illustrated is trivial file transfer protocol (TFTP) server 64 which serves the configuration files.

Figure 3:
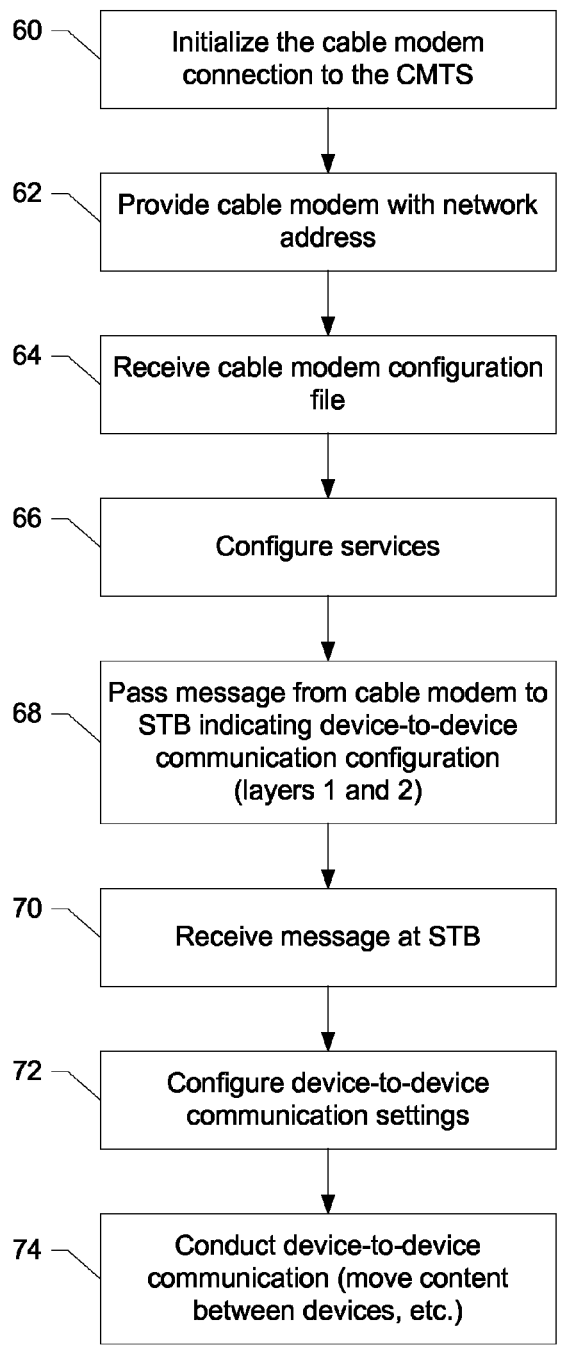
FIG. 3 illustrates initializing, provisioning, and managing a cable modem and a customer premise equipment device in the preferred embodiment of the invention.

With reference to FIGS. 1-3, a preferred embodiment of initializing, provisioning, and managing a cable modem and a customer premise equipment device is illustrated. The customer premise equipment device is depicted as an embedded set-top box 52, but may take other forms.

At block 60, the cable modem connection to the CMTS 20 is initialized. At block 62, the cable modem 50 is provided with a network address. In more detail, the cable modem is initialized and provisioned using a suitable technique such as known DOCSIS techniques. At block 64, the cable modem 50 receives the cable modem configuration file, for example, from trivial file transfer protocol (TFTP) server 64. At block 66, services are configured. At this point, the cable modem 50 has completed initialization, and is a manageable network element in the operator's IP network. This initialization process takes place for each cable modem at the subscriber location, and in the case of enhanced set-top boxes, this process takes place for each embedded cable modem.

Generally, the initializing and provisioning may take place according to DOCSIS standards or any other suitable approach involving a downloadable configuration file; however, in accordance with the invention, the configuration file sent to the cable modem includes service provisioning information and further includes information indicative of a device-to-device communication configuration for the embedded set-top box 52 (or other CPE device). More specifically, the device-to-device communication configuration relates to physical layer and data link layer communications among embedded set-top boxes 52 (or other CPE devices).

For example, the communication configuration may include information such as the electrical specification of signals (for example, frequency and coding) and frame structure for transferring frames from one host to another. The inclusion of this device-to-device communication configuration information in the configuration file is a customization to the configuration file in accordance with the invention that has many advantages. This customization may take place by, for example, adding custom fields to the configuration file. According to the invention, cable modem 50 passes a message to the set-top box 52 indicating the configuration. The message passing is indicated at block 68 in FIG. 2, which specifies that the configuration relates to layers 1 and 2 (physical and data link layers). The message passing may take any appropriate form. For example, a direct, dedicated connection between embedded cable modem 50 and embedded set-top box 52 may be used for the message passing. Depending on the application, other approaches may be appropriate, for example, when the CPE device is something other than an embedded set-top box.

At block 70, the message is received, and at block 72, the communication settings of the set-top box are configured.

It is appreciated that the invention, by customizing the configuration file, provides a way for the embedded set-top box or other CPE device behind the cable modem to be configured for device-to-device communication among other customer premise equipment devices or set-top boxes, particularly, at the same subscriber location.

At block 74, device-to-device communication is conducted, and includes moving content between devices. For example, video programming stored on one set-top box may be moved to another set-top box within the subscriber location.

In the exemplary embodiment of the invention, for each cable modem/CPE device pair, the communication configuration for the CPE device is related to the hardware address of the cable modem by the provider. Accordingly, the configuration file sent to a particular cable modem indicates the appropriate device-to-device communication configuration for the CPE device paired with the particular cable modem.

As best shown in FIG. 1, further steps may be taken to block upstream traffic toward the CMTS 20 with a filter 16. For example, a physical layer filter may be configured to block upstream traffic toward the CMTS 20 from the set-top boxes during device-to-device communications. Further, for example, a data link layer filter may be configured to block upstream traffic toward the CMTS 20 from the set-top boxes during device-to-device communication.

It is appreciated that embodiments of the invention may involve any suitable underlying initializing and provisioning technique. Further, with a customized configuration file, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
receiving, by a gateway and from a termination system of a network, configuration data comprising device-to-device communication configuration information;
configuring the gateway for communicating with the network according to the configuration data; and
forwarding the device-to-device communication configuration information from the gateway to a plurality of user devices to enable each user device of the plurality of user devices to configure itself for device-to-device communication that is between the plurality of user devices and that bypasses the gateway.

2. The method of claim 1, wherein the device-to-device communication configuration information comprises physical layer configuration information or data link layer configuration information.

3. The method of claim 1, wherein the device-to-device communication configuration information is based on a media access control (MAC) address associated with the gateway.

4. The method of claim 1, wherein the forwarding the device-to-device communication configuration information from the gateway to the plurality of user devices comprises forwarding the device-to-device communication configuration information from the gateway to at least one of the plurality of user devices via a direct, dedicated connection.

5. The method of claim 1, wherein the device-to-device communication comprises transferring video programming from a first user device of the plurality of user devices to a second user device of the plurality of user devices.

6. The method of claim 1, comprising:
blocking, during the device-to-device communication between the plurality of user devices, upstream traffic toward the network, wherein the blocking is performed using a physical layer filter.

7. The method of claim 1, comprising:
blocking, during the device-to-device communication, upstream traffic toward the network, wherein the blocking is performed using a data link layer filter.

8. The method of claim 1, wherein the device-to-device communication configuration information is customized for each user device of the plurality of user devices.

9. The method of claim 1, wherein the device-to-device communication configuration information comprises frame-structure information for the device-to-device communication.

10. A method comprising:
receiving, by a gateway, configuration information comprising a customer-premise equipment instruction;
configuring, using the configuration information, the gateway to communicate with a termination system; and
transmitting the customer-premise equipment instruction to first customer-premise equipment connected to the gateway, wherein the customer-premise equipment instruction is configured to cause device-to-device communication between the first customer-premise equipment connected to the gateway and second customer-premise equipment connected to the gateway, the device-to-device communication comprising direct communication which bypasses the gateway.

11. The method of claim 10, wherein the customer-premise equipment instruction identifies a radio frequency to be used in the device-to-device communication between the first customer-premise equipment and the second customer-premise equipment.

12. An apparatus comprising:
one or more processors; and
memory storing instructions that, when executed by the one or more processors, cause the apparatus to:
receive, from a termination system of a network, configuration data comprising device-to-device communication configuration information;
configure the apparatus for communicating with the network according to the configuration data; and
forward the device-to-device communication configuration information to a plurality of user devices to enable each user device of the plurality of user devices to configure itself for device-to-device communication that is between the plurality of user devices, and that bypasses the apparatus.

13. The apparatus of claim 12, wherein at least one of the plurality of user devices comprises a set-top box.

14. The apparatus of claim 12, wherein the apparatus and the plurality of user devices are at a same premise.

15. The method of claim 10, wherein the customer-premise equipment instruction identifies an electrical specification of signals to be used in the device-to-device communication between the first customer-premise equipment and the second customer-premise equipment.

16. The method of claim 15, wherein the electrical specification of signals to be used in the device-to-device communication between the first customer-premise equipment and the second customer-premise equipment comprises a specification of one or more of frequency and coding of the device-to-device communication.

17. The method of claim 10, wherein the customer-premise equipment instruction identifies a frame structure for transferring frames between the first customer-premise equipment and the second customer-premise equipment.

18. The method of claim 1, further comprising:
transmitting, to the termination system, device pairing information comprising information corresponding to a device pairing between a user device of the plurality of user devices and the gateway; and wherein the device-to-device communication configuration information is based on the device pairing information.

19. The method of claim 1, further comprising:

transmitting, to the termination system, device pairing information comprising information corresponding to a device pairing between two or more user devices of the plurality of user devices; and wherein the device-to-device communication configuration information is based on the device pairing information.

20. The method of claim 1, wherein the configuration data further comprises service provisioning information; and wherein the configuring the gateway for communicating with the network is according to the service provisioning information.

* * * * *

UNITED STATES PATENT AND TRADEMARK OFFICE
CERTIFICATE OF CORRECTION

PATENT NO. : 9,954,731 B2
APPLICATION NO. : 13/932619
DATED : April 24, 2018
INVENTOR(S) : Siripunkaw et al.

Page 1 of 5

It is certified that error appears in the above-identified patent and that said Letters Patent is hereby corrected as shown below:

On the Title Page

Column 2, (56) References Cited, U.S. Patent Documents, Line 1:
After "DOCUMENTS", please insert --¶5,440,632 8/1995 Bacon et al.
5,666,293 9/1997 Metz et al.
5,845,077 12/1998 Fawcett
6,023,464 2/2000 Woundy
6,308,289 10/2001 Ahrens et al.--

Column 2, U.S. Patent Documents, Line 1:
After "Fijolek et al.", insert --¶6,393,585 5/2002 Houha et al.
6,501,750 12/2002 Shaffer et al.
6,529,910 3/2003 Fleskes
6,553,568 4/2003 Fijolek et al.
6,560,203 5/2003 Beser et al.
6,570,855 5/2003 Kung et al.
6,574,796 6/2003 Roeck et al.
6,577,642 6/2003 Fijolek et al.
6,636,485 10/2003 Fijolek et al.
6,654,387 11/2003 Beser et al.
6,658,000 12/2003 Raciborski et al.
6,690,655 2/2004 Miner et al.
6,693,878 2/2004 Daruwalla et al.
6,715,075 3/2004 Loukianov
6,751,299 6/2004 Brown et al.
6,768,722 7/2004 Katseff et al.--

Column 2, U.S. Patent Documents, Line 2:
After "Borella et al.", insert --¶6,822,955 11/2004 Brothers et al.
6,831,921 12/2004 Higgins Signed and Sealed this
Fifth Day of February, 2019

Andrei Iancu
*Director of the United States Patent and Trademark Office*

CERTIFICATE OF CORRECTION (continued)
U.S. Pat. No. 9,954,731 B2

6,836,806 12/2004 Raciborski et al.
6,857,009 2/2005 Ferreria et al.
6,865,613 3/2005 Millet et al.
6,904,460 6/2005 Raciborski et al.
6,917,675 7/2005 Lazarus et al.
6,952,428 10/2005 Necka et al.
7,007,080 2/2006 Wilson
7,035,270 4/2006 Moore, Jr. et al.
7,039,432 5/2006 Strater et al.
7,058,055 6/2006 Mugica et al.
7,065,047 6/2006 Boxall et al.
7,085,814 8/2006 Gandhi et al.
7,120,139 10/2006 Kung et al.
7,127,049 10/2006 Godse et al.--

Page 2, Column 1, U.S. Patent Documents, Line 1:
After "370/526", insert --¶7,213,062 5/2007 Raciborski et al.
7,272,846 9/2007 Williams et al.
7,285,090 10/2007 Stivoric et al.
7,293,078 11/2007 Danforth
7,293,282 11/2007 Danforth et al.
7,308,700 12/2007 Fung et al.
7,334,258 2/2008 Ford et al.
7,337,217 2/2008 Wang--

Page 2, Column 1, U.S. Patent Documents, Line 2:
After "Ejzak et al.", insert --7,356,841 4/2008 Wilson et al.
7,372,809 5/2008 Chen et al.--

Page 2, Column 1, U.S. Patent Documents, Line 3:
After "726/15", insert --¶7,415,603 8/2008 Woundy et al.
7,443,883 10/2008 Seiden--

Page 2, Column 1, U.S. Patent Documents, Line 4:
After "Chin", insert --¶7,484,234 1/2009 Heaton et al.
7,496,485 2/2009 Elfadel et al.
7,496,652 2/2009 Pezzulti
7,502,841 3/2009 Small et al.
7,512,969 3/2009 Gould et al.
7,526,538 4/2009 Wilson
7,539,193 5/2009 Pfeffer et al.
7,568,220 7/2009 Burshan
7,600,003 10/2009 Okmianski et al.
7,609,619 10/2009 Naseh et al.
7,617,517 11/2009 Kay
7,647,617 1/2010 Bartfeld et al.

CERTIFICATE OF CORRECTION (continued)
U.S. Pat. No. 9,954,731 B2

7,693,171 4/2010 Gould
7,710,865 5/2010 Naseh et al.
7,747,772 6/2010 Raciborski et al.
7,769,886 8/2010 Naseh et al.
7,836,092 11/2010 Alaniz et al.--

Page 2, Column 1, U.S. Patent Documents, Line 5:
After "370/401", insert --¶7,848,234 12/2010 Mckinnon, III et al.
7,881,225 2/2011 Siripunkaw et al.
8,041,824 10/2011 Maeng
8,042,132 10/2011 Carney et al.
8,050,194 11/2011 Siripunkaw et al.
8,108,911 1/2012 Dalta et al.--

Page 2, Column 1, U.S. Patent Documents, Line 6:
After "370/401", insert --¶2001/0038690 A1 11/2001 Palmer et al.
2001/0049732 A1 12/2001 Raciborski et al.
2001/0051980 A1 12/2001 Raciborski et al.--

Page 2, Column 1, U.S. Patent Documents, Line 7:
After "Bunn et al.", insert --¶2002/0010865 A1 1/2002 Fulton et al.
2002/0013948 A1 1/2002 Aguayo et al.
2002/0042819 A1 4/2002 Reichert et al.
2002/0061012 A1 5/2002 Thi et al.--

Page 2, Column 1, U.S. Patent Documents, Line 8:
After "Dobbins et al.", insert --¶2002/0103931 A1 8/2002 Mott
2002/0106017 A1 8/2002 Dombkowski et al.
2002/0116721 A1 8/2002 Dobes et al.
2002/0147819 A1 10/2002 Miyakoshi et al.
2002/0152384 A1 10/2002 Shelest et al.
2003/0014764 A1 1/2003 Saladino et al.
2003/0069965 A1 4/2003 Ma et al.--

Page 2, Column 1, U.S. Patent Documents, Line 9:
After "725/119", insert --¶2003/0200548 A1 10/2003 Baran et al.
2004/0024912 A1 2/2004 Fukao et al.
2004/0037316 A1 2/2004 Choi et al.--

Page 2, Column 2, U.S. Patent Documents, Line 1:
After "Browne", insert --¶2004/0177133 A1 9/2004 Harrison et al.
2004/0179539 A1 9/2004 Takeda et al.
2004/0190699 A1 9/2004 Doherty et al.
2004/0213278 A1 10/2004 Pullen et al.
2004/0226051 A1 11/2004 Carney et al.--

CERTIFICATE OF CORRECTION (continued)
U.S. Pat. No. 9,954,731 B2

Page 2, Column 2, U.S. Patent Documents, Line 2:
After "Dantorth et al.", insert --¶2005/0034115 A1 2/2005 Carter et al.
2005/0047442 A1 3/2005 Volpe et al.
2005/0055595 A1 3/2005 Farzer et al.--

Page 2, Column 2, U.S. Patent Documents, Line 3:
After "Gould et al.", insert --¶2005/0060749 A1 3/2005 Hong et al.
2005/0078668 A1 4/2005 Wittenberg et al.
2005/0078688 A1 4/2005 Sharma et al.
2005/0122976 A1 6/2005 Poli et al.
2005/0123001 A1 6/2005 Craven et al.
2005/0204168 A1 9/2005 Johnston et al.--

Page 2, Column 2, U.S. Patent Documents, Line 6:
After "Karaoguz et al.", insert --¶2005/0246757 A1 11/2005 Relan et al.
2006/0031436 A1 2/2006 Sakata et al.
2006/0031921 A1 2/2006 Danforth et al.--

Page 2, Column 2, U.S. Patent Documents, Line 10:
After "Choe et al.", insert --¶2006/0159100 A1 7/2006 Droms et al.
2006/0173977 A1 8/2006 Ho et al.
2006/0184640 A1 8/2006 Hatch--

Page 2, Column 2, U.S. Patent Documents, Line 11:
After "Muhamed et al.", insert --¶2006/0206586 A1 9/2006 Ling et al.--

Page 2, Column 2, U.S. Patent Documents, Line 12:
After "Gallagher et al.", insert --¶2006/0256799 A1 11/2006 Eng
2006/0271772 A1 11/2006 Woundy et al.
2006/0271946 A1 11/2006 Woundy et al.
2006/0285544 A1 12/2006 Taylor et al.--

Page 2, Column 2, U.S. Patent Documents, Line 13:
After "Sahay et al.", insert --¶2007/0016762 A1 01/2007 Ho
2007/0130471 A1 6/2007 Walker Pina et al.
2007/0133409 A1 6/2007 McKINNON et al.
2007/0174471 A1 7/2007 Van Rossum
2007/0177526 A1 8/2007 Siripunkaw et al.
2007/0180484 A1 8/2007 Siripunkaw et al.
2007/0183405 A1 8/2007 Bennett--

Page 2, Column 2, U.S. Patent Documents, Line 18:
After "Wong et al.", insert --¶2008/0285544 A1 11/2008 Qiu et al.
2009/0005066 A1 1/2009 Florkey et al.
2009/0063833 A1 3/2009 Ho
2009/0125958 A1 5/2009 Siripunkaw et al.

CERTIFICATE OF CORRECTION (continued)
U.S. Pat. No. 9,954,731 B2

2009/0238349 A1 9/2009 Pezzutti
2010/0064356 A1 3/2010 Johnston et al.--

Page 2, Column 2, U.S. Patent Documents, Line 19:
After "726/9", insert --¶2011/0026536 A1 2/2011 Siripunkaw et al.--